United States Patent
Honrath et al.

[11] 3,845,667
[45] Nov. 5, 1974

[54] FABRICATED TUBE CONTROL CAM SHAFTS

[75] Inventors: Kurt Honrath, Hoffnungsthal; Wilhelm Naumann, Cologne-Mulheim, both of Germany

[73] Assignee: Klockner-Humboldt-Deutz Aktiengesellschaft, Cologne-Deutz, Germany

[22] Filed: Dec. 11, 1972

[21] Appl. No.: 313,945

Related U.S. Application Data

[60] Division of Ser. No. 274,746, July 24, 1972, which is a continuation of Ser. No. 15,781, March 2, 1970, abandoned.

[30] Foreign Application Priority Data

Mar. 1, 1969 Germany.................... 1910517

[52] U.S. Cl. .................................. 74/567, 72/56
[51] Int. Cl. ........................................ F16h 53/02
[58] Field of Search........ 74/567, 568 R; 123/90.18; 72/56

[56] References Cited
UNITED STATES PATENTS

| | | | |
|---|---|---|---|
| 1,637,117 | 7/1927 | Kirchensteiner............. | 123/90.18 X |
| 2,202,330 | 5/1940 | Brock et al. ........................ | 74/567 |
| 2,552,724 | 5/1951 | Lang................................ | 74/567 |
| 2,892,254 | 6/1959 | Garvin ............................ | 74/567 X |
| 3,023,870 | 3/1962 | Udelman...................... | 123/90.18 X |
| 3,577,799 | 5/1971 | Harvey............................. | 74/567 |

FOREIGN PATENTS OR APPLICATIONS 817,382  9/1937  France .................................. 74/567

Primary Examiner—Samuel Scott
Assistant Examiner—F. D. Shoemaker
Attorney, Agent, or Firm—Walter Becker

[57] ABSTRACT

Tubular shafts provided with a lifting curve, especially cam shafts for an internal combustion engine according to which the shaft is made hollow internally of a body corresponding to the contour of the shaft subject to deformation by widening portions of a pipe by means of a pressure exerted on the inside of the pipe.

2 Claims, 4 Drawing Figures

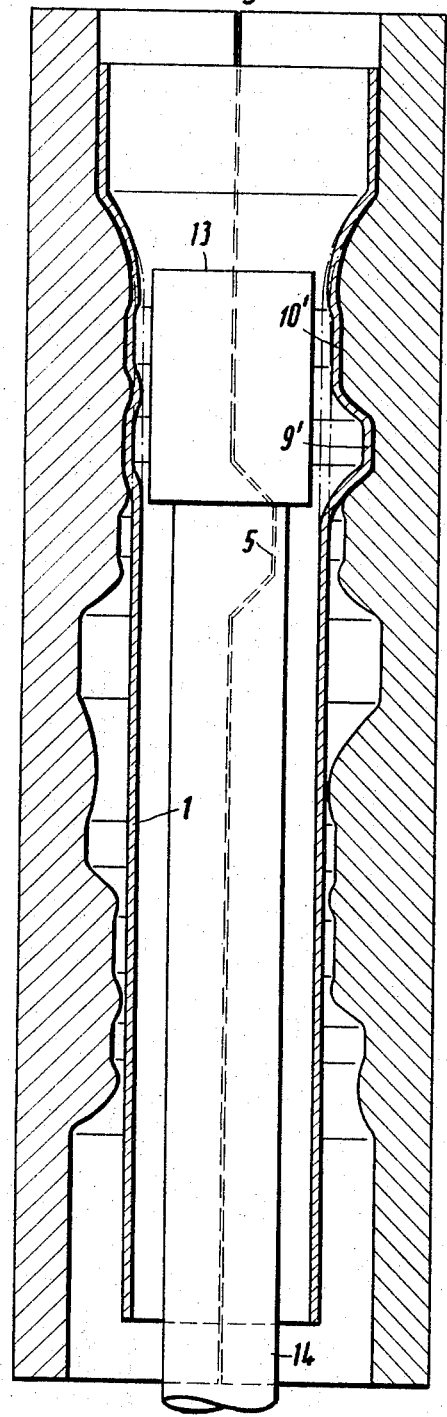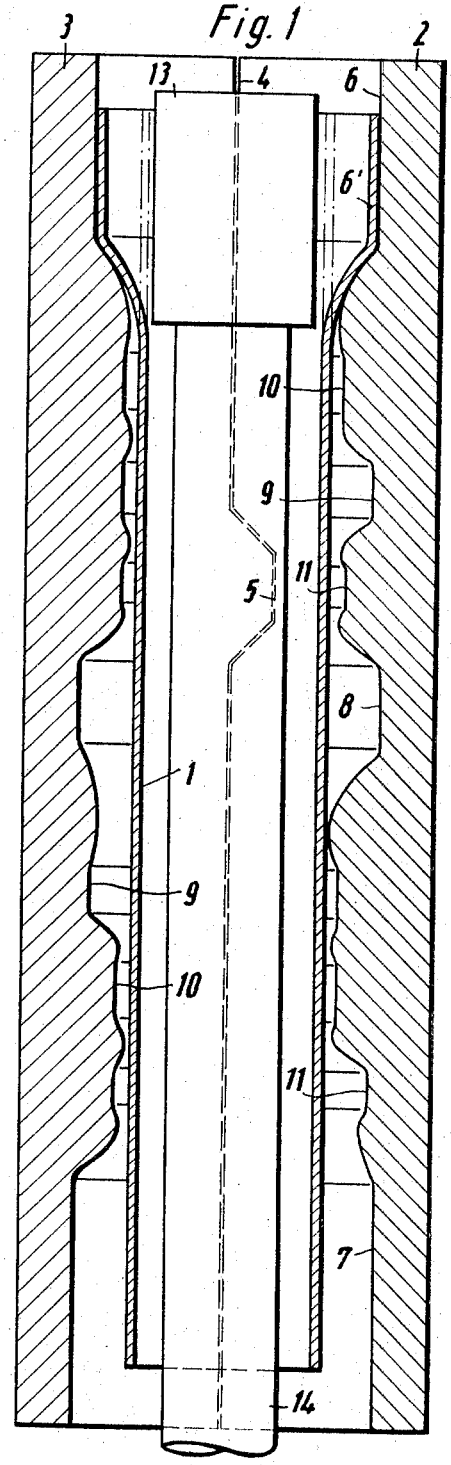

FABRICATED TUBE CONTROL CAM SHAFTS

This is a division of copending application Ser. No. 274,746-Honrath et al. filed July 24, 1972 which is a continuation of now abandoned Ser. No. 15,781-Honrath et al. filed Mar. 2, 1970.

The present invention relates to the manufacture of shafts with lifting curves, especially cam shafts for internal combustion engines. Such shafts are generally produced from round material by a chip removing operation in connection with which considerable losses in material are encountered.

It is also known to produce cam shafts by heat deforming the material and more specifically by drop-forging. In this instance the drop-forged cam shaft has to be post-ground and hardened. Such a production process is hardly more advantageous than the first mentioned method inasmuch as it is necessary prior to the grinding to align the relatively slender workpieces, which aligning operation takes considerable time.

It may also be mentioned that cam shafts have also heretofore been cast but this method does not result in the necessary surface hardeners which is necessary when the cam shaft is employed in high-speed engines.

It is, therefore, an object of the present invention to provide an improved method of producing cam shafts. This object and other objects and advantages of the invention will appear more clearly from the following specification, in connection with the accompanying drawings, in which:

FIGS. 1 and 2, respectively, illustrate in axial section two successive phases in the manufacture of a cam shaft for a two-cylinder Diesel engine according to an electromagnetic shaping of the present invention.

Figure 4:
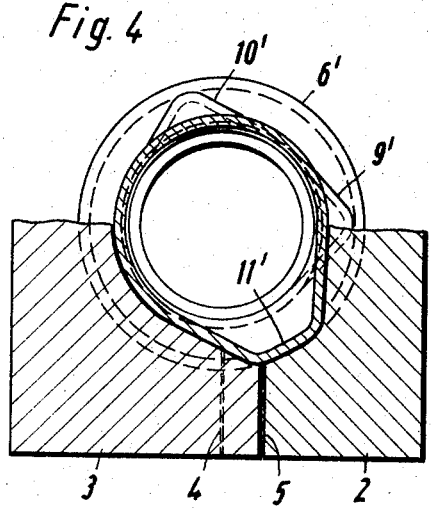
FIG. 4 is a cross-section along the line IV—IV of FIG. 3.

The method according to the invention is characterized primarily in that the cam shaft is produced within a hollow mold corresponding to the shape of the shaft and is made of a pipe by widening the same by the application of an inner pressure. For an economical manufacturing process, primarily a high speed pressing method, and especially an electromagnetic shaping method with impulse discharge is employed. Inasmuch as the last mentioned method is preferred, although other high speed pressings methods as, for instance, the explosion transforming method or the high output electric art method with water may advantageously be used, only the electromagnetic shaping method with impulse discharge will be described. The employment of an electromagnetic shaping method is limited to relatively thin-walled workpieces, and the question therefore arises whether, for instance, cam shafts working under high load can be produced for high-speed Diesel engines while assuring the necessary strength and rigidity. In addition thereto there may be mentioned the difficulty of mounting in the interior of the pipe when starting with a pipe of uniform diameter, a coil with sufficiently large diameter which will be able by an impulse discharge to convey the power necessary for the required deformation.

In order to overcome these difficulties, it is primarily suggested according to the invention to provide the cam shafts with a considerably greater core diameter than that of the customary solid shafts in order to be able by the mentioned manufacturing process to produce a cam shaft in the form of a hollow body. In this way not only will the employment of a coil of sufficient dimensions be made possible, but simultaneously also the relative magnitude of deformation will with a given radial cam height be reduced correspondingly. Moreover, it has been found that with a material increase in the core diameter, cam shapes are obtained which are more favorable for the operation of the engine. In this connection it should be noted that with the height and circumferential extension of the cam, the curvatures of the control surfaces are with a greater base diameter correspondingly less so that the so-called Hertz pressure between cam and pushrod or pushrod roll will be reduced. This is important for the transfer of the great mass forces in high speed internal combustion engines.

According to a further development of the method according to the invention, the deformation of the pipe is effected in axially offset sections and timewise one behind the other. The impulse discharge is thus always concentrated on a limited section so that it is possible to transfer a deforming energy which is sufficient also for rather thick walls.

The section-wise deformation may, according to the invention, be so carried out that the individual control cams and, as the case may be, bearing areas of larger diameter are successively widened or worked out of the pipe. It is also possible by means of a longer coil in one and the same operation to shape sections which extend over a plurality of control cams, for instance, with a shaft for multi-cylinder internal combustion engines during one and the same operation to shape the control cams pertaining to a working cylinder and, if desired, also an intermediate bearing.

The hollow mold for shaping the cam shaft may be designed as a customary drop-forged mold, which means a two-sectional mold with a separating plane located in the plane of the axis of the shaft. Said separating plane may, within the region of the control cams, be offset out of the plane of the axis depending on the angular direction of the shaping. The hollow mold may extend over the entire length of the shaft to be shaped.

It is furthermore suggested that the hollow mold comprises only the control cams and, if desired, bearing areas for only one working cylinder. After a single such section of the shaft has been formed, the mold is opened, the pipe is correspondingly displaced and turned about its axis by the angle corresponding to the desired offset angle for the next cam whereupon the next section is formed.

While normally the end faces of the control cams and bearing areas of solid shafts form planes which are at a right angle to the axis of the shaft, which planes merge approximately at a sharp edge with the circumference of the core and the control surfaces of the cam, it is suggested according to the invention for control shafts formed by widening a pipe, that the cams and, if desired, the bearing areas enlarged as to diameter have side flanks which extend from the pipe diameter and are rounded and/or inclined at an angle. Furthermore, rounded merging areas between the circumferential surfaces and the side flanks of the cam and/or bearing areas are suggested. Both suggestions serve the purpose of preventing during the deformation process, a tearing of the workpiece at the merging areas.

A deformation in warm condition of the workpiece which might be necessary in view of the properties of the workpiece and/or the employment of the method according to the invention as well as a more precise maintaining of the tolerances may be carried out in such a way that the pipe or the respective section to be deformed may prior to the deformation be heated up by alternating current induction by means of the same coil which is employed for the magnetic deformation. Between these operations, the coil is, by means of a time relay which is tuned for the required heating time or by means of a device tuned for the obtained temperature. For the purposes of the induction heating, the coil may, in a manner known per se, be wound of a tube through which is passed a cooling medium.

Referring now to the drawings in detail, the pipe 1 of which the cam shaft is to be formed is with slight radial play located in a hollow mold 2, 3 which is designed in the manner of a drop-forge die. The dividing plane 4 of the hollow mold is, over the major portion of the length located on both sides in an axial plane of the shaft. As far as it is required by the shape of the finished workpiece, the dividing plane is, for instance, at the area 5 unilaterally offset with regard to said axial plane.

Both ends of said hollow mold and also the central portion thereof comprise a cylindrical widened area 6, 7, 8 for forming three bearing journals. Therebetween are located two mold sections 9, 10 each for forming the cams 9', 10' for actuating the inlet and outlet valves, and a third mold section 11 for one cam 11' each for driving a fuel injection pump.

Coil 13 for the impulse discharge is mounted on a shank or shaft 14 which comprises the feeding lines for the supply of current, said shank being displaceable by means of a carriage (not shown) in the direction of the axis relative to the workpiece in order to permit a sectionwise forming by impulse discharges.

Figure 3:
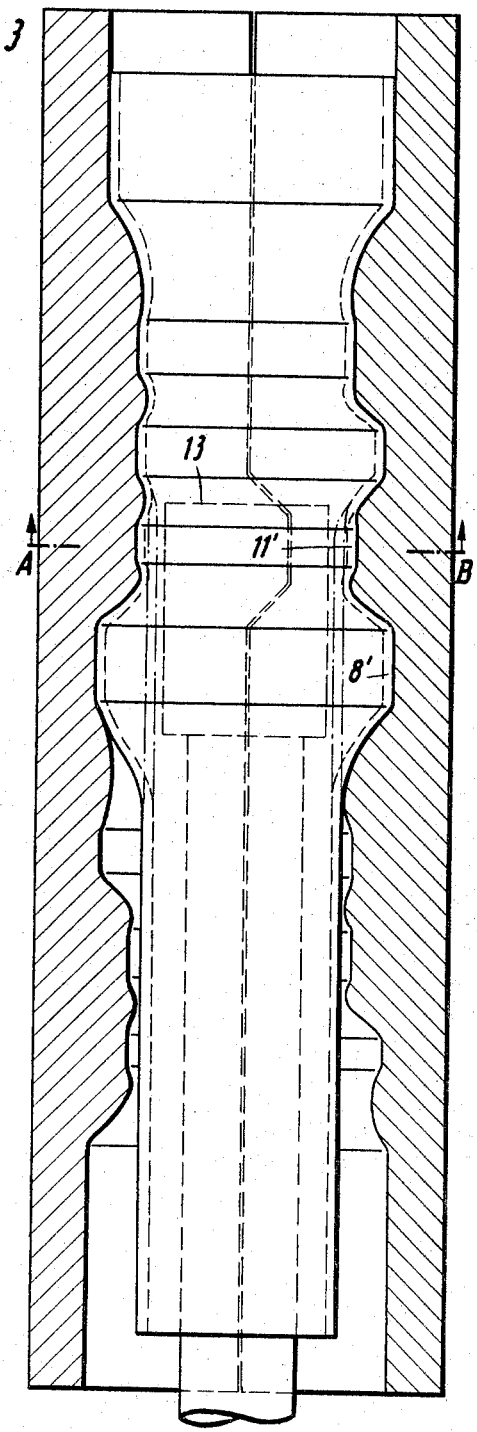
FIG. 3 illustrates a third phase of the method according to the invention by showing a section through the hollow mold.

FIG. 1 shows the coil 13 in a first position in which it has formed the bearing journal 6' from the dot-dash end of the pipe 1. In FIG. 2, the coil has in a single working step formed the adjacent cams 9', 10' for the valve of a working cylinder. FIG. 3 shows a third position of the coil in which it has formed the cam 11' for the injection pump and has also formed the intermediate bearing area 8'. The further working operations which are carried out after the coil is each time displaced by the respectively required distance are not illustrated. After the shaping of the shaft has been completed, the coil is completely removed, the mold is opened and the workpiece is withdrawn.

By means of further working operations, the shaft can have its ends closed by closure members which are introduced into the hollow bearing journals and are, for instance, welded thereto. Finally, the bearing journals and the control cams are hardened in customary manner and are ground to their desired finished dimensions.

With regard to its outer shape, a cam shaft made in conformity with the present invention differs from the customary solid shafts on one hand by a considerably larger base diameter and on the other hand by the smooth areas of transgression from the base diameter to the control cams and bearing journals.

It is to be understood that the present invention is by no means limited to the specific methods set forth above, but also comprises any modifications within the scope of the appended claims.

What we claim is:

1. A hollow shaft entirely of uniform thickness with cam means thereon, especially a cam shaft for internal combustion engines, which comprises in combination a tubular member including cam means forming a single integral piece with and pressed out of said tubular member, integral bearing means pressed out of said tubular member having entirely uniform thickness continuously therewith, said cam means having inclined side flanks gradually merging integrally with adjacent areas of said cam means, said bearing means having lateral flanks gradually merging integrally with adjacent areas of said bearing means, said cam means having inclined side flanks gradually merging integrally with adjacent circumferential areas of said hollow shaft, said bearing areas having lateral flanks gradually merging integrally with adjacent circumferential areas of said hollow shaft, said cam means being pressed out with entirely uniform thickness as to the hollow shaft subjected to electromagnetic force as internal pressure thereby resulting in external-die-conforming deformation to assure uniform thickness of said cam means compared with the entire hollow shaft to assure strength for force transmittal by said cam means rather than weakening thereof which would occur with thinning in the area of the cam means now precluded from occurring to avoid disadvantages of brittleness and lack of strength.

2. A hollow shaft in combination according to claim 1 which includes closure means closing the ends of said tubular member centrally with tapering bore.

* * * * *